United States Patent
Biederman

(10) Patent No.: US 7,366,123 B1
(45) Date of Patent: Apr. 29, 2008

(54) POWER SOURCE BASED SLEEP MODE

(75) Inventor: Daniel C. Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1024 days.

(21) Appl. No.: 10/016,087

(22) Filed: Dec. 12, 2001

(51) Int. Cl.
*G08C 17/00* (2006.01)

(52) U.S. Cl. .................................. 370/311; 370/318

(58) Field of Classification Search ............ 370/311, 370/318, 319, 465, 428, 411–419, 444, 445, 370/446, 401, 328, 474, 475, 476, 442, 448; 340/825.08
See application file for complete search history.

(56) References Cited

U.S. PATENT DOCUMENTS

| | | | |
|---|---|---|---|
| 4,082,922 A * | 4/1978 | Chu | 370/230 |
| 4,839,640 A * | 6/1989 | Ozer et al. | 340/5.33 |
| 5,216,674 A | 6/1993 | Peter et al. | 371/29.5 |
| 5,560,021 A | 9/1996 | Vook et al. | 395/750 |
| 5,581,556 A | 12/1996 | Ohie | 370/431 |
| 5,636,220 A | 6/1997 | Vook et al. | 370/338 |
| 6,085,114 A | 7/2000 | Gibbons et al. | 455/574 |
| 6,714,534 B1 * | 3/2004 | Gerszberg et al. | 370/352 |
| 2003/0219029 A1 * | 11/2003 | Pickett | 370/442 |

\* cited by examiner

*Primary Examiner*—Ajit Patel
(74) *Attorney, Agent, or Firm*—Baker Botts L.L.P.

(57) ABSTRACT

A device and method to allocate a secondary power supply to a Fiber-to-the-Home subscriber is disclosed. The present invention employs methods to selectively accept or rejects packets in order to conserve power of the secondary power supply while allowing critical packets to reach their destinations.

40 Claims, 4 Drawing Sheets

US 7,366,123 B1

POWER SOURCE BASED SLEEP MODE

TECHNICAL FIELD OF THE INVENTION

The present invention relates generally to network power allocation. In particular, the present invention detects power failures and then rejects non-critical packets to reduce power consumption.

BACKGROUND OF THE INVENTION

Fiber-to-the-Home (FTTH) is one of the hottest new markets in optical networking. Utilities, cable providers, telephone companies, and other communication based entities are starting to connect homes and businesses to the Internet through fiber as opposed to coaxial cable or telephone wire. Fiber permits data transmission bandwidths of one Gigabit/second and higher. Therefore, with fiber these entities will be able to provide high bandwidth data services, such as video on demand, and voice services to the homes of subscribers.

These entities currently are building and retrofitting circuits to be used at subscriber homes that will convert the data traffic from an optical signal to an electrical signal. In addition, these entities are also adding a secondary power source, which in most instances is a battery backup, to the home systems to keep the home gateway open in the case of a power failure of a primary power source. This addition of a battery backup is significant. For example, in the case of an emergency where a primary power source fails, a subscriber may still use selective network resources powered by the battery backup to contact emergency services.

SUMMARY OF THE INVENTION

The present invention relates generally to network power allocation. In particular, the present invention detects power failures and then selectively rejects non-critical packets, thus conserving power. In accordance with a first exemplary embodiment of the present invention, a fiber-to-the-home (FTTH) gateway device having inputs for both the main power supply and the secondary power supply, respectively, is used to reject non-voice packets. In accordance with a second exemplary embodiment of the present invention, a FTTH gateway device having inputs for both the main power supply and the secondary power supply, respectively, rejects packets based upon priority by examining the header of each packet. In accordance with a third exemplary embodiment of the present invention, a FTTH gateway device having inputs for both the main power supply and the secondary power supply, respectively, rejects packets based upon priority by examining the contents of the packet. In accordance with a fourth exemplary embodiment of the present invention, a FTTH gateway device having inputs for both the main power supply and the secondary power supply, respectively, provides for a graceful closing of non-critical connections by sending a message to the source of non-critical packets that a power failure has occurred and that the non-critical packets did not reach their destination, such that the source of the non-critical packets will know to re-transmit at a later time.

Further, the FTTH gateway device of any of the above-described embodiments may also comprise a two-port or multiple port arrangement, where one port is a dedicated voice port that connects into the home telephone line or to one or more IP phones whose power may be regulated by the FTTH gateway device of the present invention. In addition, an IP telephone may have its own primary and secondary power supply.

The present invention provides the technical advantage of conserving the power of a secondary power supply during the failure of a main power supply. The present invention ensures that critical packets have a means to be received and/or be transmitted during a failure of the main power supply. For example, Internet Protocol (IP) telephony devices would still be operational in a power failure in accordance with the present invention.

While this summary has dealt with an FTTH gateway, the concept applies to other network devices such as a router. In this case, any packet manipulation (inspection, processing, management, and assembly) would be performed by a processor within the router, and the power savings would come from the cycles the processor saves by rejecting a packet after determining the packet will not be processed and forwarded out to one or more of the interfaces. Finally, any packet-based device could use these techniques to reduce power consumption. These devices include, but should not be limited to, a set top box, a cable modem, a home gateway, a hub, a switch, a wireless telephone, a base station, a line card, etc.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DETAILED DESCRIPTION OF THE INVENTION

Figure 1:
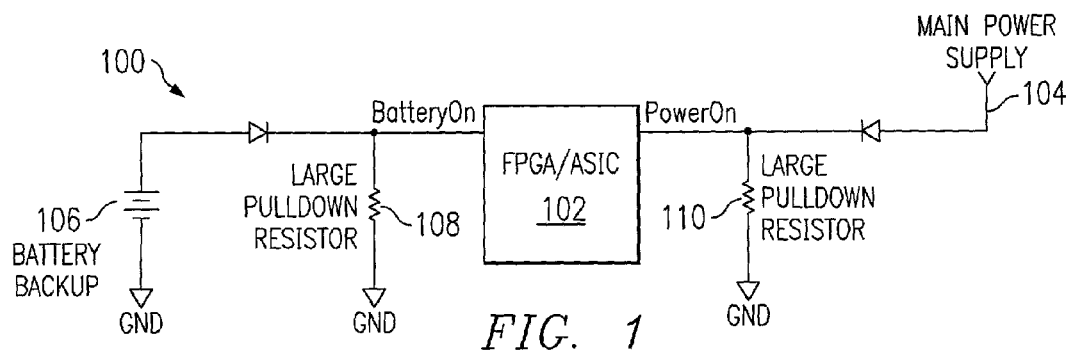
FIG. 1 is an illustration of a conventional circuit used to supply battery backup power upon a power failure of a main power supply.

Now referring to the drawings, FIG. 1 shows a conventional circuit 100 which includes an application-specific integrated circuit ("ASIC") 102, a main power supply 104 and a battery backup 106. The ASIC 102 converts the data traffic from its optical signal to an electrical signal. In coordination with large pulldown resistor 106 and large pulldown resistor 108, when the "Power On" signal from the main power supply 104 is low the "Battery On" signal from the battery backup 106 is high, thus utilizing the battery backup 106 when the main power supply 104 has failed. The "Power On" and "Battery On" signals are directly interfaced with the ASIC 102.

Figure 2:
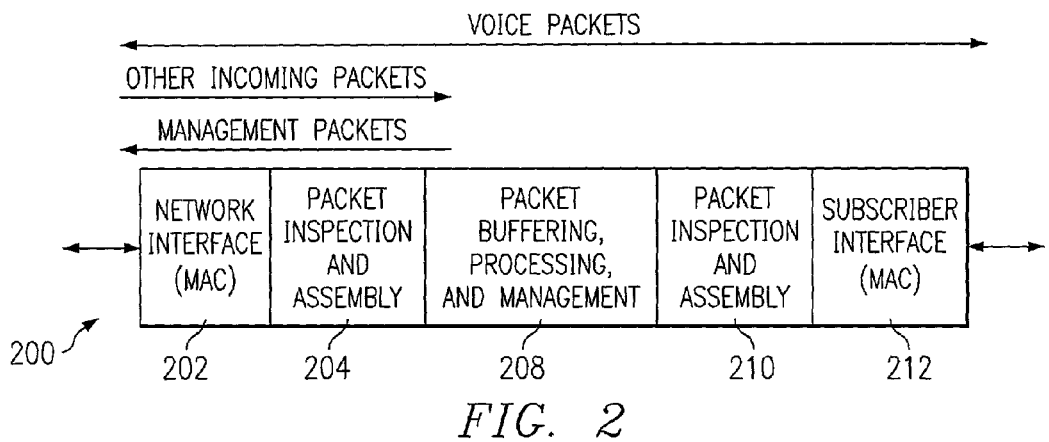
FIG. 2 illustrates an exemplary two-port FTTH gateway device of the present invention.

The "Power On" or "Battery On" signals may be monitored by a plurality of devices that respond to current power conditions, e.g. a power failure. In accordance with the present invention, FIG. 2 illustrates a Fiber-to-the-Home gateway device ("gateway device") 200. The gateway device 200 includes a network interface 202; first and second packet inspection and assembly units 204, 210; a packet, buffering, processing and management unit 206; and a subscriber interface 212. The exemplary gateway device 200 is a two-port network device. Alternatively, the gateway device 200 can be a multi-port device.

In normal operation, a packet is received at the network interface 202. The network interface 202 passes the packet to the first packet inspection and assembly unit 204 such that the packet can be inspected in accordance with one or more of the exemplary embodiments of the present invention discussed below. The packet is then sent to the packet buffering, processing, and management unit 208, where the packet is stored. The packet buffering, processing, and management unit 208 is also where packets are accepted or rejected during a power failure in accordance with the present invention as described in detail below. If accepted and released by the packet buffering, processing, and management unit 208, the packet is passed on to the subscriber interface 212, from which a subscriber client may receive the packet after being assembled by the second packet inspection and assembly unit 210. The second packet inspection and assembly device 210 is also used for packets originating from the subscriber client, thus it is used for packets traveling in the reverse direction (subscriber to network) of the process flow described above. Note that the technique can apply in either direction. A subscriber client may be a personal computer, high definition television, conventional television, set top box, video converter, IP telephony device, modem, plain old telephony system ("POTS") telephony device, wireless telephone, home gateway device, hub, switch, router, or any other device which sends and/or receives data packets.

Figure 3:
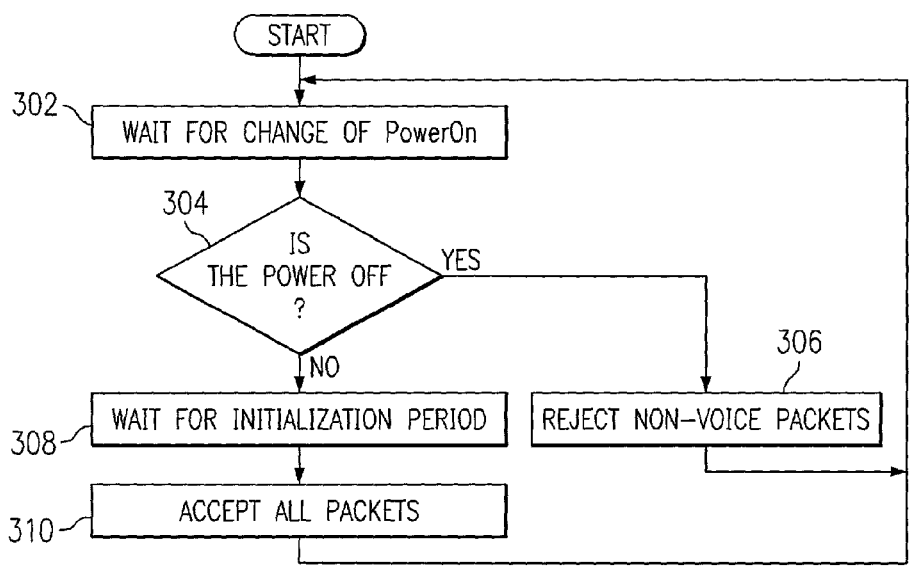
FIG. 3 is a flow chart of a first exemplary embodiment of the present invention, where only voice packets are accepted during failure of a main power supply.

FIG. 3 is a flow chart illustrating a first exemplary embodiment of the present invention, where only voice packets are accepted during a power failure of the main power supply 104. The gateway device 200 waits for a change of the "Power On" signal in block 302. If there is a change in the "Power On" signal, the gateway device 200 determines whether the main power supply 104 is "off," in block 304. If the main power supply is "off," indicating a power failure, in block 306 non-voice packets are rejected and will not pass to or from the subscriber client(s) (home user device). This is easily accomplished in a two-port device such as the device of FIG. 2 (or a router that can detect the status of its power source, see FIG. 8 below), by rejecting all non-voice packets attempting to be transmitted. If, in block 304, the main power supply is detected as "on," then the gateway device 200 is initialized in block 308, after which the gateway device 200 accepts all packets in block 310. Similarly, compression operations, e.g., compress, decompress, etc., can be selectively performed on packets, also to conserve power, using the above method or methods described below.

Figure 4:
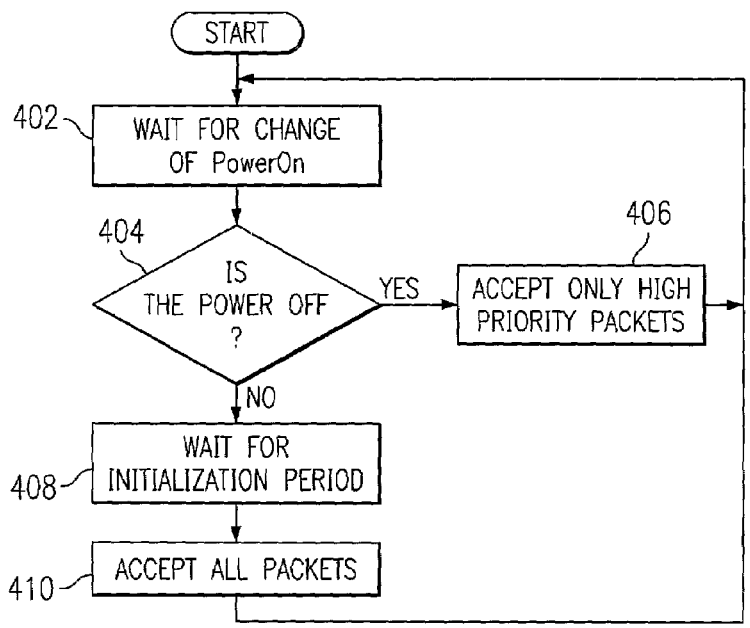
FIG. 4 is a flow chart of a second exemplary embodiment of the present invention, where only high priority packets are accepted during failure of a main power supply.

A second exemplary embodiment is illustrated in the flow chart of FIG. 4. In accordance with the second exemplary embodiment, only "high priority" packets are accepted during a failure of the main power supply 104. "High priority" packets may be defined in a variety of ways including packets originating from particular network addresses, i.e., IP address; virtual local area network ("VLAN") assignments; quality of service metric; IEEE 802.1p class of service; service level agreements; and/or bandwidth allocation. The header of each packet is examined by the packet inspection and assembly units 204, 212 to determine whether a packet meets a pre-defined "high priority" criteria.

As a basic example of this embodiment, FIG. 4 illustrates a flow chart where the gateway device 200 waits for a change of the "Power On" signal in block 402. If there is a change in the "Power On" signal, the gateway device 200 determines in block 404 whether the main power supply 104 is "off." If the main power supply 104 is "off," indicating a power failure, only high priority packets are accepted and will pass to or from the subscriber client(s) in block 406. If, in block 404, the main power supply 104 is detected as "on," then the gateway device 200 is initialized in block 408, after which the gateway device 200 in block 410 accepts all packets.

Figure 5:
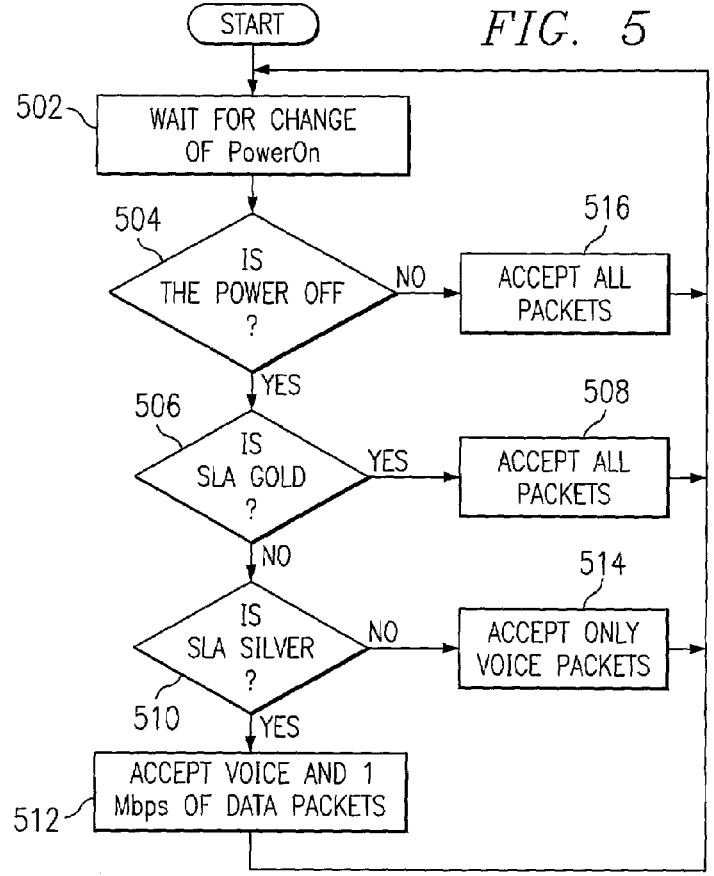
FIG. 5 is another flow chart of the second exemplary embodiment of the present invention, where subscribers are distinguished such that different subscribers may have different service levels during failure of a main power supply.

FIG. 5 illustrates a more complex exemplary embodiment, where packets are accepted or rejected based upon a subscriber's service level agreement. In FIG. 5, the gateway device 200 waits for a change of the "Power On" signal in block 502. If there is a change in the "Power On" signal, the gateway device 200 determines, in block 504, whether the main power supply is "off." If the main power supply is "off," indicating a power failure, the gateway device 200 determines, in block 506, whether the subscriber to receive the packet has a Gold service level agreement ("SLA"). For purposes of example only, it is assumed that a Gold SLA is the most premium package offer by the service provider. If the subscriber has a Gold SLA, then all packets will be accepted in block 508. If the subscriber does not have a Gold SLA, then the gateway device 200 checks, in block 510, whether the subscriber has a Silver SLA, some service less than the Gold SLA. If the subscriber has a Silver SLA then only voice packets and packets up to one Mbps are accepted in block 512. If the subscriber has neither a Gold nor Silver SLA, then, in block 514 only voice packets are accepted. If the main power supply is detected as "on," in block 504, then the gateway device 200 accepts all packets in block 516.

Figure 6:
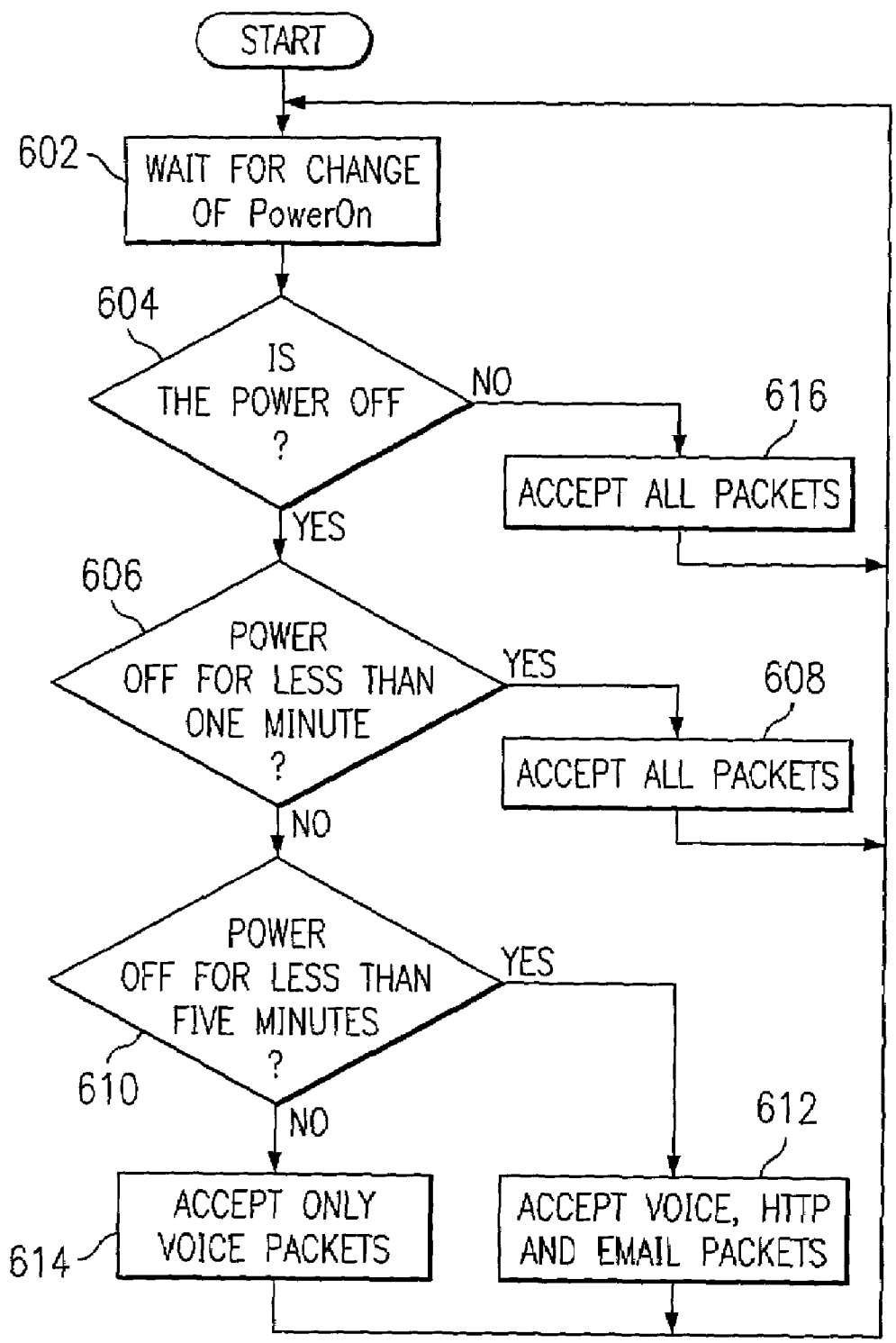
FIG. 6 is another flow chart of the second exemplary embodiment of the present invention, where packets are accepted based upon the length of the power failure of the main power supply.

FIG. 6 illustrates yet another exemplary variation of the second embodiment, where packets are accepted or rejected based upon the type of packet and duration of the power failure. In FIG. 6, the gateway device 200 waits for a change of the "Power On" signal in block 602. If there is a change in the "Power On" signal, the gateway device 200 determines, in block 604, whether the main power supply 104 is "off." If the main power supply 104 is "off," indicating a power failure, the gateway device 200 determines, in block 606, whether the main power supply 104 has been "off" for less than one minute. If the main power supply 104 has been "off" for less than one minute, all packets are accepted in block 608. This prevents the gateway device 200 from going into a full fault recovery when the power failure is de minimum. If the main power supply 104 has been "off" for more than one minute, the gateway device 200 determines in block 610 if the main power supply 104 has been "off" for less than five minutes. If the main power supply 104 has been "off" for more than one minute but less than five minutes, then voice, web pages (HTTP), and e-mail packets are accepted in block 612. If the main power supply 104 is "off" for more than five minutes, then only voice packets are accepted in block 614. If the main power supply is detected as "on" in block 604, then, in block 616 the gateway device 200 accepts all packets. This method allows the gateway device 200 to adapt to the power failure based upon the severity of the power failure as measured by the duration of the power failure, thus, intelligently conserving battery backup power.

In a third exemplary embodiment, the same methods of the second embodiment are employed as illustrated in FIGS. 4-6; however, the contents, not solely the header, of each packet are examined at the packet inspection and assembly units 204, 212.

Figure 7:
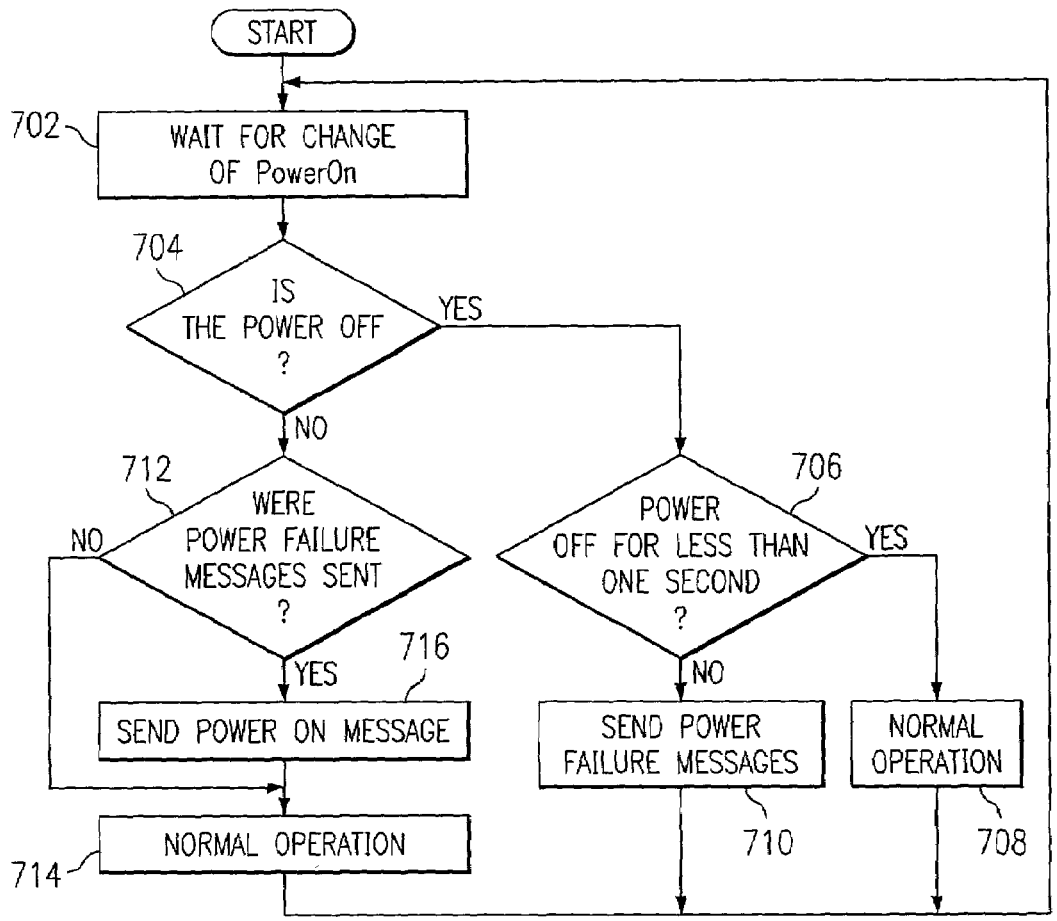
FIG. 7 is a flow chart of a fourth exemplary embodiment of the present invention, where sources of rejected packets are notified of a power failure and connections are gracefully closed for those sources.

FIG. 7 illustrates a fourth exemplary embodiment, where the source of a rejected packet is sent a message indicating the same. In FIG. 7, the gateway device 200 waits for a change of the "Power On" signal in block 702. If there is a change in the "Power On" signal, the gateway device 200 determines, in block 704, whether the main power supply 104 is "off." If the main power supply 104 is "off," indicating a power failure, the gateway device 200 determines, in block 706, whether the main power supply 104 has been "off" for less than one second. If the main power supply 104 has been "off" for less than one second, normal operation continues in block 708. This prevents the gateway device 200 from prematurely sending messages of a power failure when the power failure is de minimus. If the main power supply 104 has been "off" for more than one second, the gateway device 200 sends a message in block 710 indicating the power failure to the source (sender) of the packet. If the main power supply 104 is detected as "on" in block 704, then the gateway device 200 determines, in block 712, whether a power failure message was previously sent. If a power failure message had not been previously sent, the normal operation resumes in block 714. If a power failure message was previously sent, then in block 716 a message indicating that power has been restored is sent to the source of the previously rejected packet. After the message indicating that power has been restored has been sent, normal operation resumes in block 714.

Figure 8:
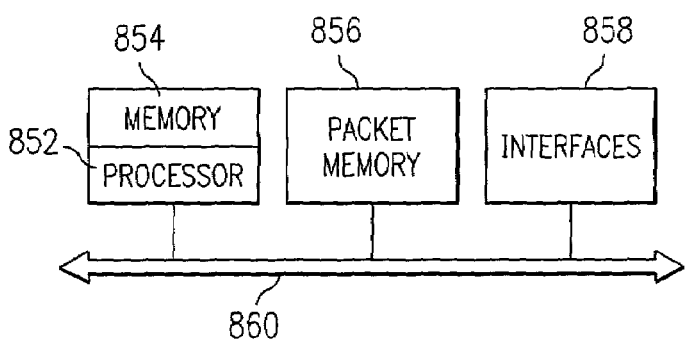
FIG. 8 is an illustration of an exemplary router in which the present invention may be implemented.

In addition to the gateway device 200, the present invention may also be implemented in a router as shown in FIG. 8. Router 850 which includes a processor 852, a memory 854, a packet memory 856, and one or more interfaces 858. In this exemplary embodiment, "Battery On" and/or "Power On" propagated on a line 860, where the line 860 may also propagate data packets. Alternatively, "Battery On" and/or "Power On" signals may be directly connected to processor 852. "Battery On" and/or "Power On" signals are monitored by the processor 852 either through a direct connection (such as interrupts) or by polling the "Battery On" and/or "Power On" signals on the line 860 to verify if such signals have changed. The above described methods of the present invention are performed in the router 850 by the processor 852.

Although the present invention has been described in detail with reference to specific exemplary embodiments thereof, various modifications, alterations and adaptations may be made by those skilled in the art without departing from the spirit and scope of the invention. For example, the above device and method of the present invention may be implemented at the home of a subscriber, at a curb-side router servicing many subscribers, or using computer code in a computer program product.

In addition, the device and method of the present invention may be implemented under a variety of distributed networks protocols and is not limited to the transmission control protocol/Internet protocol (TCP/IP) or the network interface protocol MAC. Further, the device and method of the present invention may be used for packets being received as well as packets being sent from a subscriber, such that a subscriber's own transmissions may not circumvent the selective packet acceptance methods of the present invention. The term "packet" as used in the above description is intend to be interpreted as any piece of data or group of data, irrespective of size, which is in a form to be transmitted or received. It is intended that the invention be limited only by the appended claims.

What is claimed is:

1. A device for selectively accepting packets during a power failure, said device comprising:
   an interface, said interface receiving a packet;
   a packet inspection and assembly unit, said packet inspection and assembly unit examining said packet received from said interface; and
   a packet buffering, processing and management unit, said packet buffering, processing and management unit selectively accepting packets in response to a power failure, wherein said packet buffering, processing and management unit sends a message indicating a power has been restored to a source of a rejected packet which was previously sent a message indicating a power failure to said source of said rejected packet when said power failure occurred, and wherein said packet buffering, processing and management unit accepts packets based, at least in part, upon a length of time of the power failure.

2. The device of claim 1 further comprising a second interface, said second interface sending a packet to a subscriber client.

3. The device of claim 2 further comprising a second packet inspection and assembly unit, said second packet inspection and assembly unit examining said packet sent to said second packet inspection and assembly unit by said second interface.

4. The device of claim 1, wherein said packet buffering, processing and management unit accepts only voice packets.

5. The device of claim 1, wherein said packet buffering, processing and management unit accepts only high priority packets.

6. The device of claim 5, wherein said packet inspection and assembly unit determines high priority packets by examining the header of each packet received by said interface.

7. The device of claim 5, wherein said packet inspection and assembly unit determines high priority packets by examining the contents of each packet received by said interface.

8. The device of claim 2, wherein said packet buffering, processing and management unit accepts only high priority packets.

9. The device of claim 8, wherein a second packet inspection and assembly unit determines high priority packets by examining the header of each packet received by said second interface.

10. The device of claim 8, wherein a second packet inspection and assembly unit determines high priority packets by examining the contents of each packet received by said second interface.

11. The device of claim 5, wherein a high priority packet is defined by one or more of a service level agreement, a quality of service metric, a bandwidth allocation, virtual local area network assignments, a class of service, and an Internet Protocol address.

12. The device of claim 8, wherein a high priority packet is defined by one or more of a service level agreement, a quality of service metric, a bandwidth allocation, virtual local area network assignments, a class of service, or an Internet Protocol address.

13. The device of claim 1, wherein a subscriber client comprises one or more of a Internet Protocol telephony device, a wireless telephone, a plain old telephony system telephony device, a gateway device, a hub, a switch, a personal computer, a conventional television, a video converter, a set top box, or a router.

14. The device of claim 1, wherein said packet buffering, processing and management unit selectively performs compression operations on packets.

15. The device of claim 1, wherein said packet buffering, processing and management unit sends a message indicating a power failure to a source of a rejected packet upon said power failure.

16. The device of claim 1, wherein said packet buffering, processing and management unit regulates bandwidth in response to said power failure.

17. The device of claim 1, wherein said packet buffering, processing and management unit regulates packet compression in response to said power failure.

18. The device of claim 1, wherein said packet buffering, processing and management unit regulates packet decompression in response to said power failure.

19. The device of claim 1 further comprising a processor, said processor examining packets.

20. The device of claim 1 further comprising a router.

21. The device of claim 1, wherein said packet buffering, processing and management unit selectively stores packets in response to said power failure.

22. The device of claim 1, wherein said packet buffering, processing and management unit selectively transmits packets in response to an absence of said power failure.

23. A device for selectively accepting packets during a power failure, said device comprising:
means for receiving a packet at an interface;
means for identifying information from said packet;
means for identifying available power sources for packet transmission or reception to selectively accept packets during a power failure;
means for determining whether to transmit or drop said packet; and
means for transmitting packets from said interface, wherein a message is sent that indicates power has been restored to a source of a rejected packet which was previously sent a message indicating a power failure to said source of said rejected packet when said power failure occurred, and wherein packets are accepted based, at least in part, upon a length of time of the power failure.

24. The device of claim 23, wherein said information is contained in a header of said packet.

25. The device of claim 23, wherein said power sources comprise at least one main power supply.

26. The device of claim 23, wherein said power sources comprise at least one backup power supply.

27. The device of claim 23, wherein said means for transmitting transmits only voice packets.

28. The device of claim 23, wherein said means for transmitting transmits only high priority packets.

29. The device of claim 28, wherein said high priority packets are defined by one or more of a service level agreement, a quality of service metric, a bandwidth allocation, virtual local area network assignments, a class of service, and a device address.

30. The device of claim 29, wherein the device address comprises an Internet Protocol address.

31. The device of claim 29, wherein the device address comprises an Ethernet MAC address.

32. A computer readable medium encoded with software instructions capable of being executed by a computer, the medium for forwarding data across a communication network, said computer medium comprising:
computer code that inspects packets for information;
computer code that determines power source-related information;
computer code that uses said packet information and said power source-related information to make a determination for selectively accepting said packet; and
the computer-readable medium that stores said computer code, wherein a message is sent that indicates power has been restored to a source of a rejected packet which was previously sent a message indicating a power failure to said source of said rejected packet when said power failure occurred, and wherein packets are accepted based, at least in part, upon a length of time of the power failure.

33. The computer medium of claim 32, wherein said computer-readable medium is one selected from the group consisting of a CD-ROM, a flash computer memory, a system memory, a floppy disk, a tape drive, a hard drive, and a data signal embodied in a carrier wave.

34. A device for selectively accepting packets during a power failure, said device comprising:
a network interface, said network interface receiving a packet traveling in a first direction;
a first packet inspection and assembly unit, said first packet inspection and assembly unit examining said packet received from said network interface;
a packet buffering, processing and management unit, said packet buffering, processing and management unit selectively accepting packets in response to a power failure;
a second interface, said second interface sending said packet to a subscriber client in a second direction; and
a second packet inspection and assembly unit, said second packet inspection and assembly unit sending said second interface said packet traveling in said first direction from said packet buffering, processing and management unit, and examining packets traveling in said second direction received from said second interface and passing said packets traveling in a second direction to said packet buffering, processing and management unit, wherein said packet buffering, processing and management unit sends a message indicating a power has been restored to a source of a rejected packet which was previously sent a message indicating a power failure to said source of said rejected packet when said power failure occurred, and wherein said packet buffering, processing and management unit accepts packets based, at least in part, upon a length of time of the power failure.

35. A method of selectively accepting packets during a power failure, said method comprising:
receiving a packet;
examining said packet received; and
selectively accepting said packet based upon said examination of said packet received and available power sources, wherein a message is sent that indicates power has been restored to a source of a rejected packet which was previously sent a message indicating a power failure to said source of said rejected packet when said power failure occurred, and wherein packets are accepted based, at least in part, upon a length of time of the power failure.

36. The method of claim 35, wherein said examining said packet received comprises examining a header of said packet.

37. The method of claim 35, wherein said examining said packet received comprises examining contents of said packet.

38. The method of claim 35, wherein selectively accepting said packet based upon said examination of said packet received comprises only accepting voice packets.

39. The method of claim 35, wherein selectively accepting said packet based upon said examination of said packet received comprises only accepting high priority voice packets, said high priority packets being identified in said examination of said packet received.

40. The method of claim 35 further comprising selectively performing compression operations on said packet.

* * * * *